United States Patent
Seok

(10) Patent No.: US 10,129,874 B2
(45) Date of Patent: Nov. 13, 2018

(54) METHOD AND DEVICE FOR TRANSCEIVING FRAME COMPRISING PARTIAL ASSOCIATION IDENTIFIER IN WIRELESS LAN SYSTEM

(71) Applicant: LG ELECTRONICS INC., Seoul (KR)

(72) Inventor: Yongho Seok, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/106,767

(22) PCT Filed: Jul. 4, 2014

(86) PCT No.: PCT/KR2014/006003
§ 371 (c)(1),
(2) Date: Jun. 20, 2016

(87) PCT Pub. No.: WO2015/093704
PCT Pub. Date: Jun. 25, 2015

(65) Prior Publication Data
US 2016/0338047 A1    Nov. 17, 2016

Related U.S. Application Data

(60) Provisional application No. 61/919,611, filed on Dec. 20, 2013, provisional application No. 61/924,216, filed on Jan. 6, 2014.

(51) Int. Cl.
*H04W 72/04* (2009.01)
*H04B 7/26* (2006.01)
(Continued)

(52) U.S. Cl.
CPC ...... *H04W 72/0446* (2013.01); *H04B 7/2643* (2013.01); *H04W 8/26* (2013.01);
(Continued)

(58) Field of Classification Search
CPC .......... H04W 72/0446; H04W 72/0413; H04B 7/2643
See application file for complete search history.

(56) References Cited

U.S. PATENT DOCUMENTS 6,778,508 B1 * 8/2004 Uematsu ................ H04B 7/204
370/319
2006/0252443 A1 * 11/2006 Sammour ............... H04W 4/08
455/518

(Continued)

FOREIGN PATENT DOCUMENTS

CN    102948091    2/2013
JP    2015515237   5/2015

(Continued)

OTHER PUBLICATIONS

Russian Federation Federal Service for Intellectual Property, Patents and Trademarks Application Serial No. 2016123610/07, Office Action dated Apr. 10, 2017, 15 pages.

(Continued)

*Primary Examiner* — Siming Liu
(74) *Attorney, Agent, or Firm* — Lee, Hong, Degerman, Kang & Waimey

(57) ABSTRACT

The present invention relates to a wireless communication system, and more specifically disclosed are a method and a device for transceiving a frame comprising a partial association identifier (PAID) in the wireless communication system. A method for transmitting the frame in a station (STA) of the wireless communication system according to one embodiment of the present invention comprises a step of transmitting the frame comprising a PAID field, and: if the frame is a frame other than a control frame when the frame is an uplink frame to be transmitted to an access point (AP), the value of the PAID field can be set as a value other than 0, which is calculated on the basis of BSSID (Basic Service (Continued)

Set ID) of the AP; and if the frame is the control frame when the frame is the uplink frame, the value of the PAID field can be set as 0.

15 Claims, 11 Drawing Sheets

(51) Int. Cl.
    *H04W 8/26*         (2009.01)
    *H04W 74/08*       (2009.01)
    *H04W 76/11*       (2018.01)
    *H04W 84/12*       (2009.01)

(52) U.S. Cl.
    CPC ..... *H04W 72/042* (2013.01); *H04W 72/0413* (2013.01); *H04W 74/0816* (2013.01); *H04W 76/11* (2018.02); *H04W 84/12* (2013.01)

(56) References Cited

U.S. PATENT DOCUMENTS

| | | | |
|---|---|---|---|
| 2007/0153686 A1* | 7/2007 | Xiang | H04L 47/10 370/229 |
| 2012/0087358 A1 | 4/2012 | Zhu et al. | |
| 2012/0182867 A1* | 7/2012 | Farrag | H04W 28/0236 370/230 |
| 2012/0327862 A1 | 12/2012 | Lee et al. | |
| 2013/0142095 A1 | 6/2013 | Calcev et al. | |
| 2014/0369276 A1* | 12/2014 | Porat | H04L 5/003 370/329 |

FOREIGN PATENT DOCUMENTS

| | | | |
|---|---|---|---|
| KR | 10-2013-0005289 | 1/2013 | |
| RU | 2010136921 | 3/2012 | |
| WO | 2013082489 | 6/2013 | |
| WO | 2013/162280 | 10/2013 | |
| WO | 2013162279 | 10/2013 | |
| WO | WO 2013162280 A1 * | 10/2013 | ............ H04W 28/06 |

OTHER PUBLICATIONS

PCT International Application No. PCT/KR2014/006003, Written Opinion of the International Searching Authority dated Oct. 15, 2014, 19 pages.

Seok, Y., "LB 200 CID 2165 comment resolution," IEEE P802.11 Wireless LANs, doc.: IEEE 802.11-12/1234r00, Jan. 2014, 3 pages.

State Intellectual Property Office of the People's Republic of China Application Serial No. 201480069689.1, Office Action dated Jun. 20, 2018, 16 pages.

* cited by examiner

FIG. 7
(a) 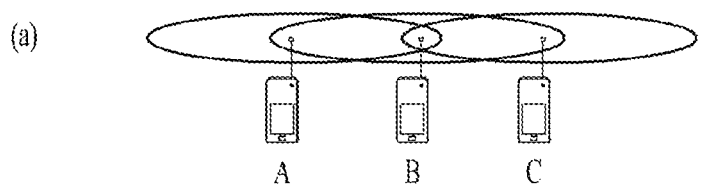
(b) 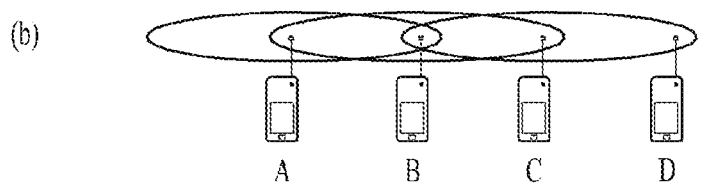

METHOD AND DEVICE FOR TRANSCEIVING FRAME COMPRISING PARTIAL ASSOCIATION IDENTIFIER IN WIRELESS LAN SYSTEM

CROSS-REFERENCE TO RELATED APPLICATIONS

This application is the National Stage filing under 35 U.S.C. 371 of International Application No. PCT/KR2014/006003, filed on Jul. 4, 2014, which claims the benefit of U.S. Provisional Application No. 61/919,611, filed on Dec. 20, 2013 and 61/924,216, filed on Jan. 6, 2014, the contents of which are all hereby incorporated by reference herein in their entirety.

TECHNICAL FIELD

The present invention relates to a wireless communication system, and more particularly, to a method and apparatus for transmitting and receiving a frame including a Partial Association Identifier (PAID) in a Wireless Local Area Network (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, IEEE 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DISCLOSURE

Technical Problem

Machine-to-Machine (MTM) communication is under discussion as a future-generation communication technology. A technical standard supporting M2M communication is also being developed as Institute of Electrical and Electronics Engineers (IEEE) 802.11ah in IEEE 802.11 WLAN. For M2M communication, a scenario in which a very small amount of data is transmitted and received at a low rate from time to time in an environment with a huge number of devices may be considered.

Communication is conducted on a medium shared among all devices in the WLAN system. If the number of devices increases as is the case with M2M communication, consumption of much time for channel access of one device may obstruct power saving of each device as well as degrade overall system performance.

An object of the present invention is to provide a new method for configuring a frame including a Partial Association Identifier (PAID).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In an aspect of the present invention, a method for transmitting a frame by a Station (STA) in a wireless communication system includes transmitting a frame including a Partial Association Identifier (PAID) field, if the frame is an uplink frame transmitted to an Access Point (AP) and the uplink frame is not a control frame, the PAID field is set to a non-zero value calculated based on a Basic Service Set Identifier (BSSID) of the AP, and if the frame is the uplink frame transmitted to the AP and the uplink frame is the control frame, the PAID field is set to zero.

In another aspect of the present invention, a STA for transmitting a frame in a wireless communication system includes a transceiver and a processor. The processor is configured to transmit a frame including a PAID field by controlling the transceiver. If the frame is an uplink frame transmitted to an AP and the uplink frame is not a control frame, the PAID field is set to a non-zero value calculated based on a BSSID of the AP, and if the frame is the uplink frame transmitted to the AP and the uplink frame is the control frame, the PAID field is set to zero.

In the above aspects of the present invention, the followings are applicable.

If the uplink frame is not a control frame, a value of the PAID field may be calculated by $(dec(BSSID[39:47]))mod (2^9-1))+1$ where BSSID represents the BSSID of the AP, $dec(A)$ represents a decimal value of a binary number A, $A[b:c]$ represents bit b to bit c of the binary number A, when an initial bit of the binary number A is bit 0, and mod represents a modulo operation.

The frame may be a non-Null Data Packet (non-NDP) frame.

The frame may include an uplink/downlink indication field, and the uplink/downlink indication field may be set to a value indicating that the frame is the uplink frame.

The size of PAID field may be 9 bits.

In another aspect of the present invention, a method for receiving a frame at a STA in a wireless communication system includes receiving a frame including a PAID field. If the frame is a downlink frame received from an AP and the downlink frame is not a control frame, the PAID field is set to a value calculated based on an AID allocated to the STA by the AP and a BSSID of the AP, and if the frame is the downlink frame received from the AP and the downlink frame is the control frame, the PAID field is set to zero.

In another aspect of the present invention, a STA for receiving a frame in a wireless communication system includes a transceiver, and a processor. The processor is configured to receive a frame including a PAID field by controlling the transceiver. If the frame is a downlink frame received from an AP and the downlink frame is not a control frame, the PAID field is set to a value calculated based on an AID allocated to the STA by the AP and a BSSID of the AP, and if the frame is the downlink frame received from the AP and the downlink frame is the control frame, the PAID field is set to zero.

In the above aspects of the present invention, the followings are applicable.

I the downlink frame is not a control frame, the value of the PAID may be calculated by $dec(AID[0:8])+dec(BSSID[44:47]$ XOR $BSSID[40:43])\times 2^5) \mod 2^6$ where AID represents the AID allocated to the STA, BSSID represents the BSSID of the AP, dec(A) represents a decimal value of a binary number A, A[b:c] represents bit b to bit c of the binary number A, when an initial bit of the binary number A is bit 0, and mod represents a modulo operation.

If the downlink frame is not the control frame, the value of the PAID field may be set to a non-zero value.

If the frame is a downlink frame, the frame may further include a COLOR field, and the COLOR field may be set to a value ranging from 0 to 7.

The frame may be a non-NDP frame.

The frame may include an uplink/downlink indication field, and the uplink/downlink indication field may be set to a value indicating that the frame is the downlink frame.

The size of the PAID field may be 6 bits.

It is to be understood that both the foregoing general description and the following detailed description of the present invention are exemplary and explanatory and are intended to provide further explanation of the invention as claimed.

Advantageous Effects

According to the present invention, a new method and apparatus for configuring a frame including a Partial Association Identifier (PAID) can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

FIG. 7 is a conceptual diagram illustrating a hidden node and an exposed node.

BEST MODE FOR CARRYING OUT THE INVENTION

Figure 1:
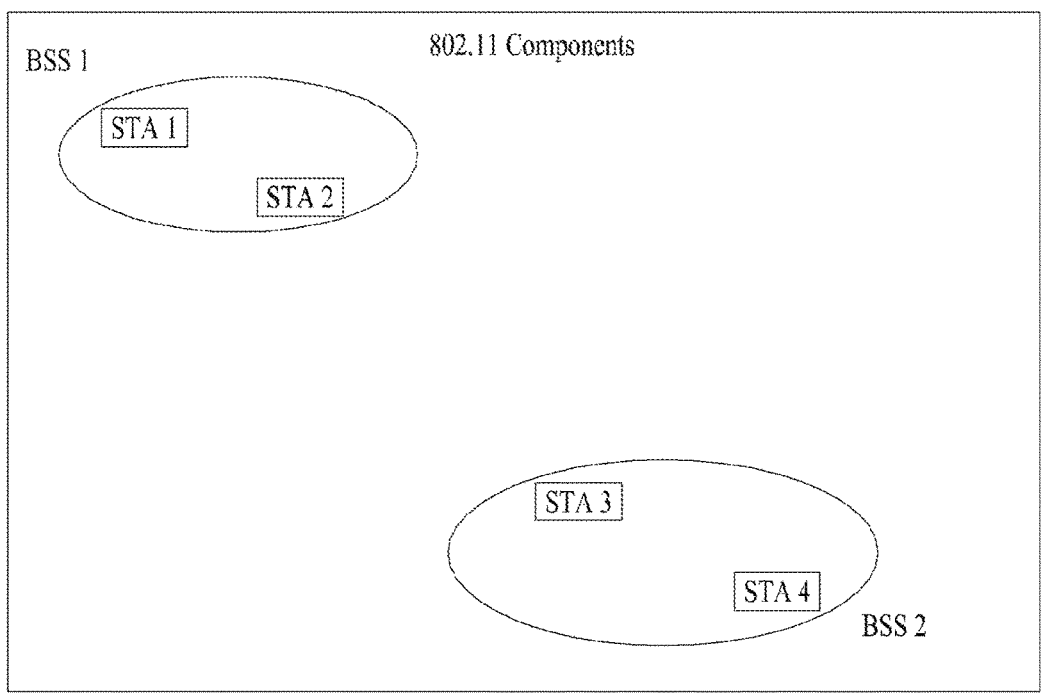
FIG. 1 exemplarily shows an Institute of Electrical and Electronic Engineers (IEEE) 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a 3$^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through wireless (or radio) technology such as Universal Terrestrial Radio Access (UTRA) or CDMA2000. TDMA may be embodied through wireless (or radio) technology such as Global System for Mobile communication (GSM)/General Packet Radio Service)/EDGE (Enhanced Data Rates for GSM Evolution (GPRS). OFDMA may be embodied through wireless (or radio) technology such as Institute of Electrical and Electronics Engineers (IEEE) 802.11 (Wi-Fi), IEEE 802.16 (WiMAX), IEEE 802-20, and Evolved UTRA (E-UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If a STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of a STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
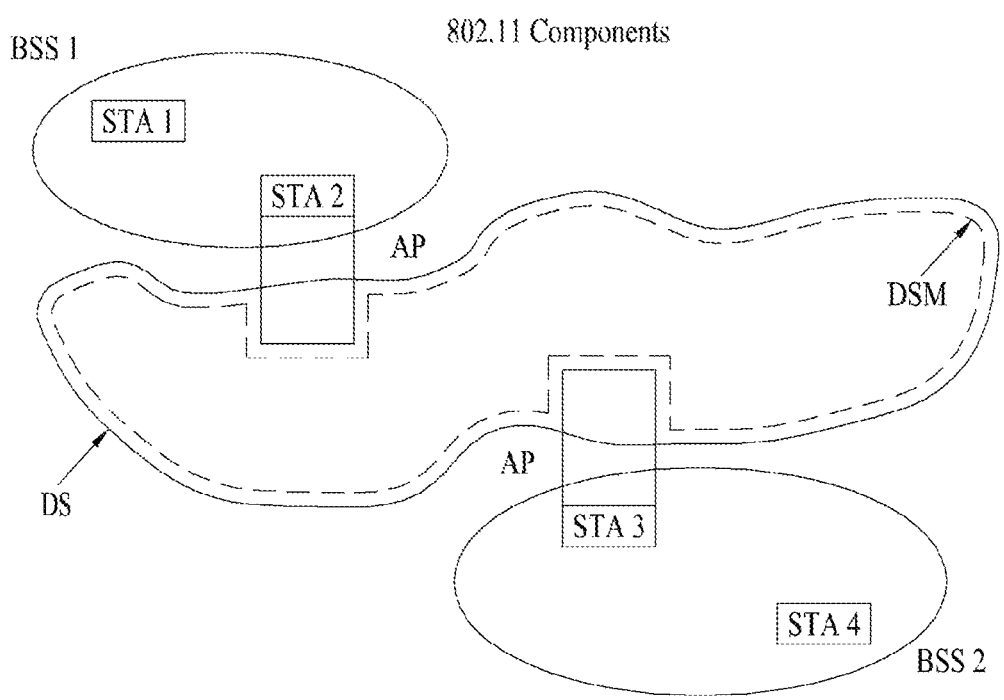
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by Physical layer (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to a STA address of the AP may always be received by an uncontrolled port and may be processed by an IEEE 802.1X port access entity. If the controlled port is authenticated, transmission data (or frame) may be transmitted to the DS.

Figure 3:
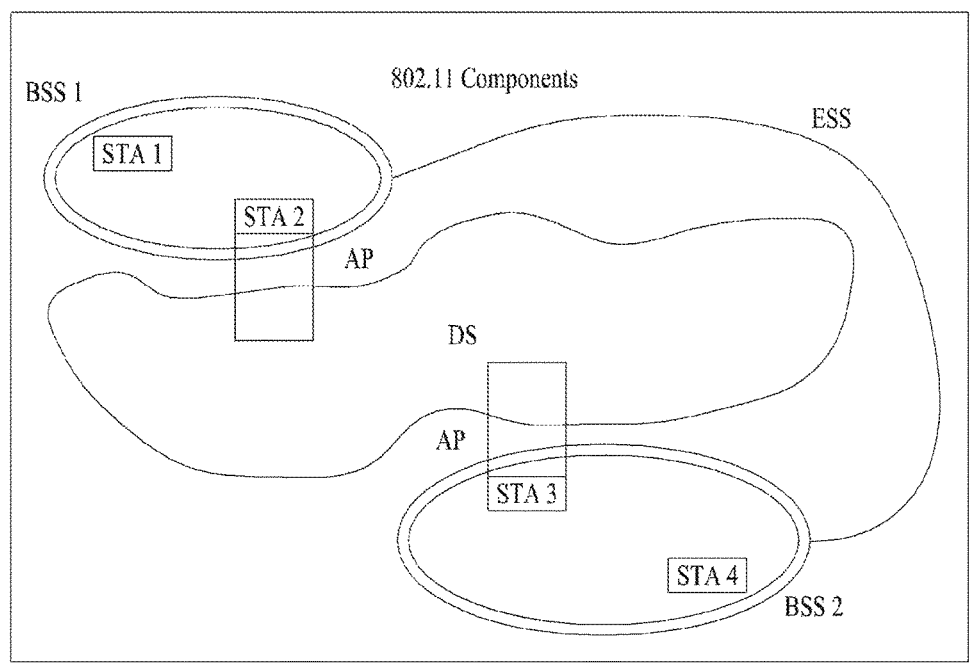
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
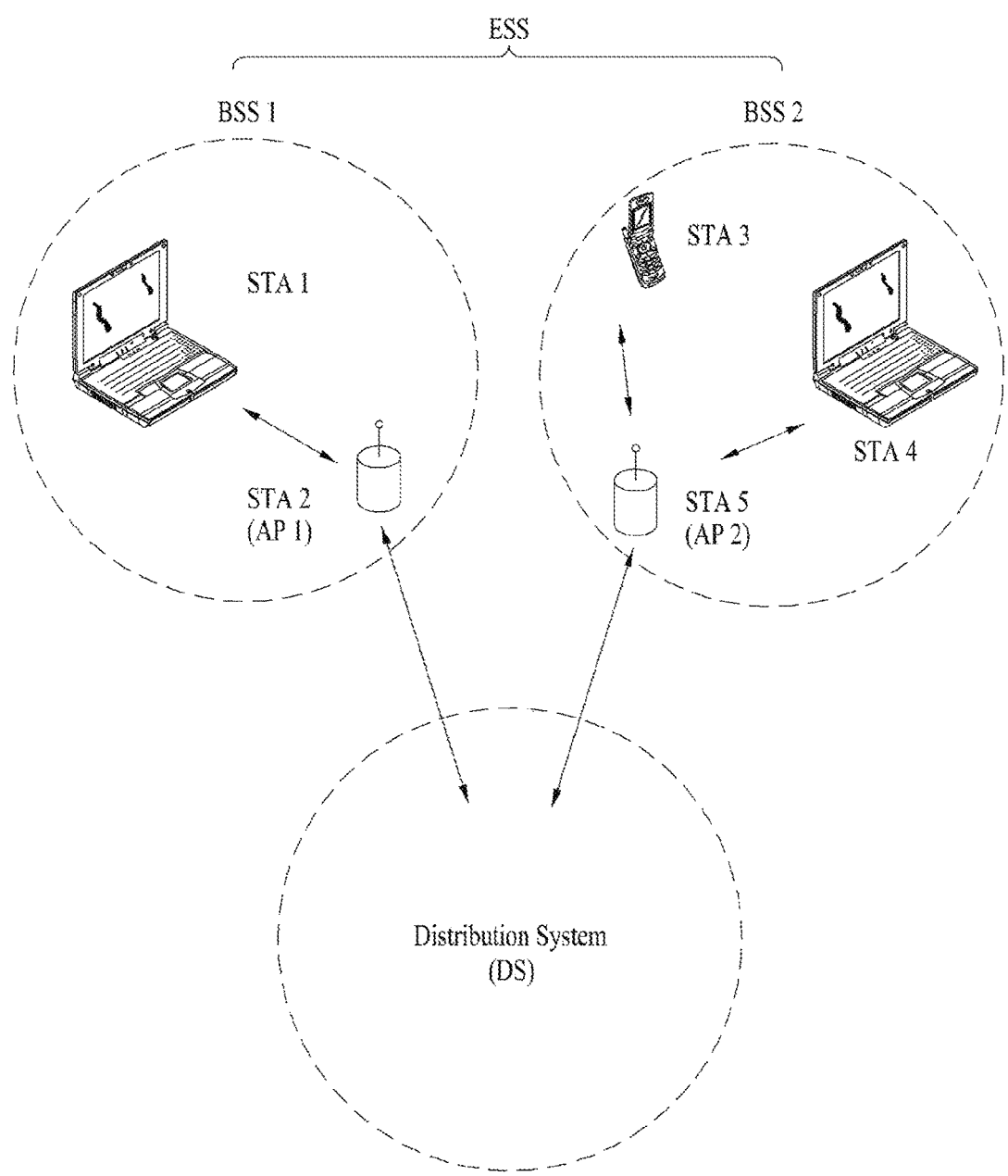
FIG. 4 is a conceptual diagram illustrating a Wireless Local Area Network (WLAN) system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, a STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Layer Architecture

An operation of a STA in a WLAN system may be described from the perspective of a layer architecture. A processor may implement the layer architecture in terms of device configuration. The STA may have a plurality of layers. For example, the 802.11 standards mainly deal with a MAC sublayer and a PHY layer on a Data Link Layer (DLL). The PHY layer may include a Physical Layer Convergence Protocol (PLCP) entity, a Physical Medium Dependent (PMD) entity, and the like. Each of the MAC sublayer and the PHY layer conceptually includes management entities called MAC sublayer Management Entity (MLME) and Physical Layer Management Entity (PLME). These entities provide layer management service interfaces through which a layer management function is executed.

To provide a correct MAC operation, a Station Management Entity (SME) resides in each STA. The SME is a layer independent entity which may be perceived as being present in a separate management plane or as being off to the side. While specific functions of the SME are not described in detail herein, the SME may be responsible for collecting layer-dependent states from various Layer Management Entities (LMEs) and setting layer-specific parameters to similar values. The SME may execute these functions and implement a standard management protocol on behalf of general system management entities.

The above-described entities interact with one another in various manners. For example, the entities may interact with one another by exchanging GET/SET primitives between them. A primitive refers to a set of elements or parameters related to a specific purpose. An XX-GET.request primitive is used to request a predetermined MIB attribute value (management information-based attribute information). An XX-GET.confirm primitive is used to return an appropriate MIB attribute information value when the Status field indicates "Success" and to return an error indication in the Status field when the Status field does not indicate "Success". An XX-SET.request primitive is used to request setting of an indicated MIB attribute to a predetermined value. When the MIB attribute indicates a specific operation, the MIB attribute requests the specific operation to be performed. An XX-SET.confirm primitive is used to confirm that the indicated MIB attribute has been set to a requested value when the Status field indicates "Success" and to return an error condition in the Status field when the Status field does not indicate "Success". When the MIB attribute indicates a specific operation, it confirms that the operation has been performed.

Also, the MLME and the SME may exchange various MLME_GET/SET primitives through an MLME Service Access Point (MLME_SAP). In addition, various PLME_GET/SET primitives may be exchanged between the PLME and the SME through a PLME_SAP, and exchanged between the MLME and the PLME through an MIME-PLME_SAP.

Link Setup Process

Figure 5:
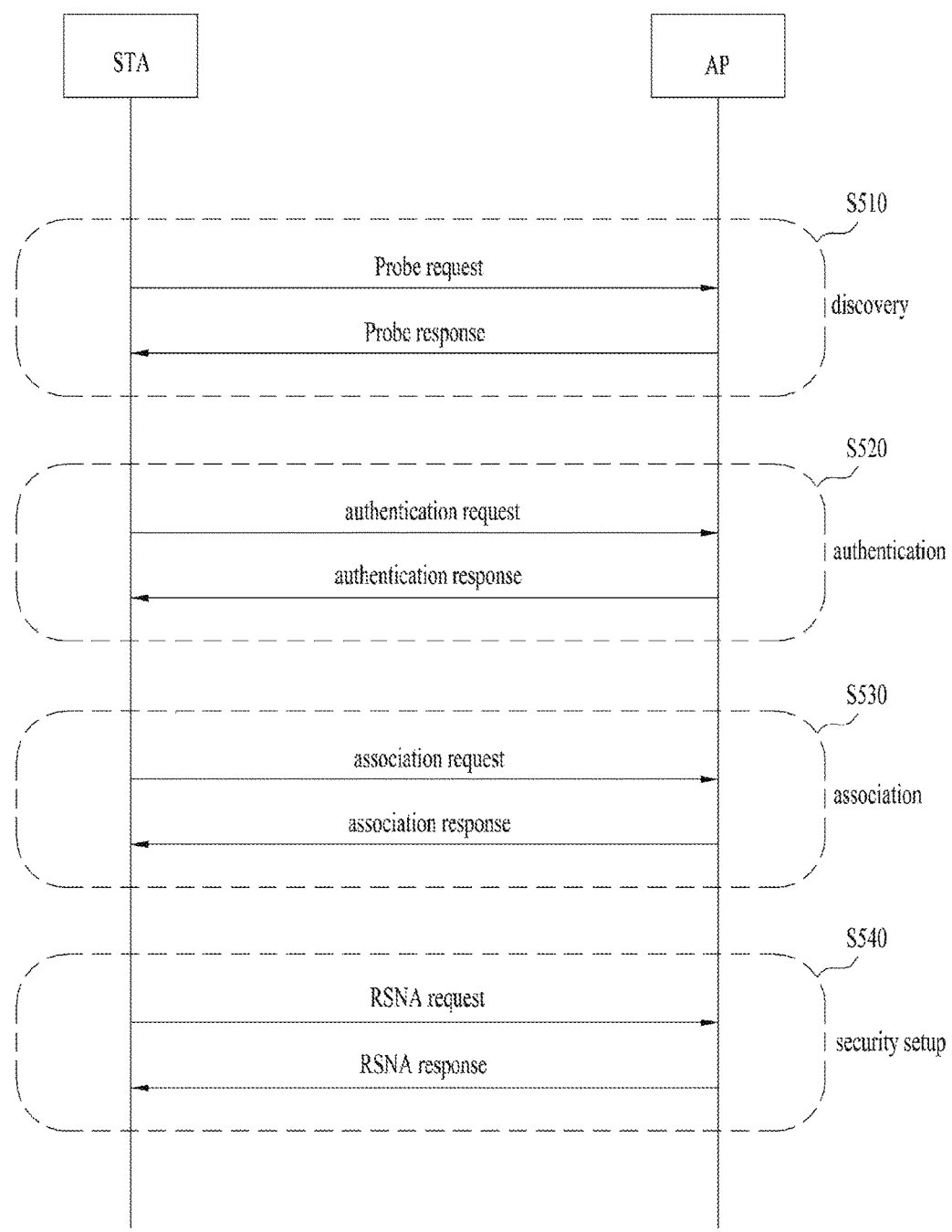
FIG. 5 is a flowchart illustrating a link setup process for use in the WLAN system.

FIG. 5 is a flowchart explaining a general link setup process according to an exemplary embodiment of the present invention.

In order to allow a STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, a STA configured to perform scanning transmits a probe request frame and waits for a response to the probe request frame, such that the STA can move between channels and at the same time can determine which Access Point (AP) is present in a peripheral region. A responder transmits a probe response frame, acting as a response to the probe request frame, to the STA having transmitted the probe request frame. In this case, the responder may be a STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. A STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a Quality of Service (QoS) map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a Medium Access Control Service Access Point (MAC SAP).

In order to efficiently utilize a radio frequency (RF) channel, the next generation WLAN system supports Multi User Multiple Input Multiple Output (MU-MIMO) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the White Space (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

Machine-to-Machine (M2M) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or M2M communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point Of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a Traffic Indication Map (TIM), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). In addition, the STA operates according to a command received via downlink (i.e., a link from the AP to the non-AP STA) in M2M communication, such that data is reported through uplink (i.e., a link from the non-AP STA to the AP). M2M communication is mainly focused upon the communication scheme improved on uplink for transmission of the principal data. In addition, an M2M STA is mainly operated as a battery and the user may feel difficulty in frequently charging the M2M STA with electricity, such that battery consumption is minimized, resulting in an increased battery lifetime. In addition, the user may have difficulty in directly handling the M2M STA in a specific situation, such that a self-recovery function is needed. Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period, and at the same time can reduce power consumption of the STA.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

WLAN Operating at Sub-1 GHz

As described above, the IEEE 802.11ah standard in which M2M communication is set to a use case has recently been discussed. The IEEE 802.11ah standard is operated in an unlicensed band other than a TV whitespace band at a sub-1 GHz operation frequency, and has a wider coverage (for example, a maximum of 1 km) than a legacy WLAN mainly supporting a conventional indoor coverage. That is, differently from the legacy WLAN operated at a frequency of 2.4 GHz or 5 GHz, if a WLAN is operated at an operation frequency of sub-1 GHz (for example, 700~900 MHz), the AP coverage is increased about two or three times as compared to the same Transmit (Tx) power due to propagation characteristics of the corresponding band. In this case, a large number of STAs may be connected per AP. The Use Case considered in the IEEE 802.11ah standard can be summarized as shown in the following Table 1.

TABLE 1

| Use Case 1: Sensors and meters |
|---|
| 1a: Smart Grid - Meter to Pole |
| 1c: Environmental/Agricultural Monitoring |
| 1d: Industrial process sensors |
| 1e: Healthcare |
| 1f: Healthcare |
| 1g: Home/Building Automation |
| 1h: Home sensors |
| Use Case 2: Backhaul Sensor and meter data |
| Backhaul aggregation of sensors |
| Backhaul aggregation of industrial sensors |
| Use Case 3: Extended range Wi-Fi |
| Outdoor extended range hotspot |
| Outdoor Wi-Fi for cellular traffic offloading |

In accordance with Use Case 1 of Table 1, M2M communication in which various kinds of sensors/meter devices are connected to an 802.11ah AP is made available. Specifically, smart grid technology enables a maximum of 6000 sensors/meter devices to be connected to one AP.

In accordance with Use Case 2 of Table 1, an 802.11ah AP configured to provide a large coverage serves as a backhaul link of a different system such as IEEE 802.15.4g.

In accordance with Use Case 3 of Table 1, Use Case 3 may support extended home coverage, campus wide coverage, and outdoor extended range hotspot communication such as shopping-mall range hotspot communication. In accordance with Use Case 3, an 802.11ah AP supports traffic offloading of cellular mobile communication, such that cellular traffic overload can be scattered.

A Physical (PHY) layer for sub-1 GHz communication is implemented by performing $\frac{1}{10}$ down-clocking of the legacy IEEE 802.11ac PHY. In this case, the channel bandwidth of 20/40/80/160/80+80 MHz for use in 802.11ac is provided through $\frac{1}{10}$ down-clocking, and the channel bandwidth of 2/4/8/16/8+8 MHz is provided at sub-1 GHz. Therefore, a Guard Interval (GI) is increased from 0.8 μs to 8 μs, such that the GI is increased ten fold. The following Table 2 shows the result of comparison between 802.11ac PHY throughput and ¹/₁₀ down-clocked sub-1 GHz PHY throughput.

TABLE 2

| IEEE 802.11ac PHY Channel Bandwidth/Throughput | ¹/₁₀ down-clocked sub-1 GHz PHY Channel Bandwidth/Throughput |
|---|---|
| 20 MHz/86.7 Mbps | 2 MHz/8.67 Mbps |
| 40 MHz/200 Mbps | 4 MHz/20 Mbps |
| 80 MHz/433.3 Mbps | 8 MHz/43.33 Mbps |
| 160 MHz/866.7 Mbps | 16 MHz/86.67 Mbps |
| 80 + 80 MHz/866.6 Mbps | 8 + 8 MHz/86.66 Mbps |

Medium Access Mechanism

In the IEEE 802.11—based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval [for example, a DCF Inter-Frame Space (DIFS)], prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all Reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
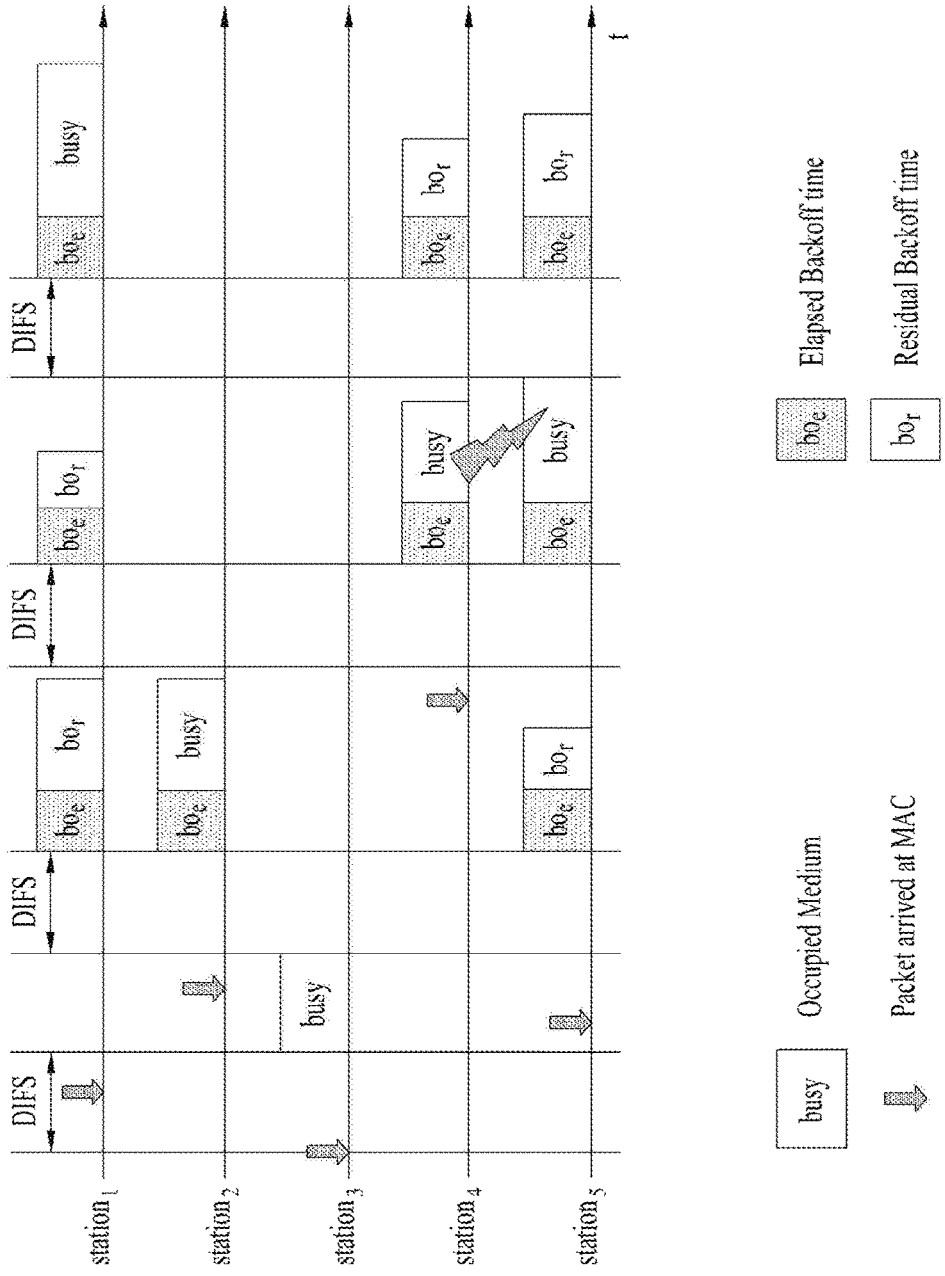
FIG. 6 is a conceptual diagram illustrating a backoff process.

FIG. 6 is a conceptual diagram illustrating a backoff process.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff process starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. A STA having received the NAV value may prohibit or defer medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
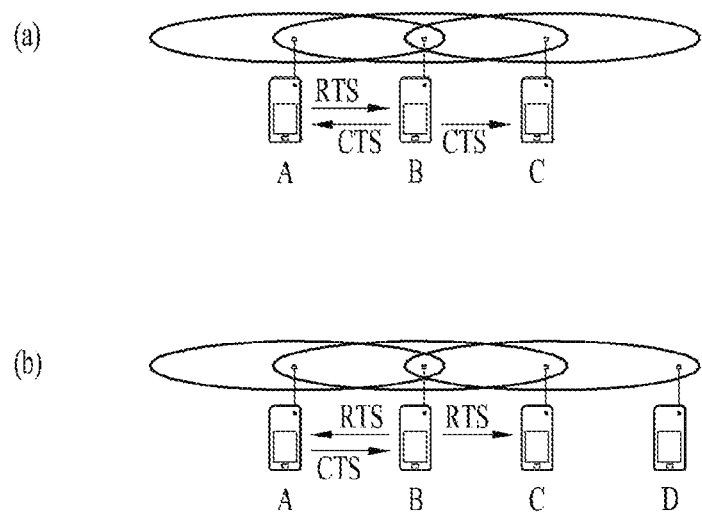
FIG. 8 is a conceptual diagram illustrating RTS (Request To Send) and CTS (Clear To Send).

FIG. 8 is a conceptual diagram illustrating Request To Send (RTS) and Clear To Send (CTS).

In order to efficiently utilize the collision avoidance mechanism under the above-mentioned situation of FIG. 7, it is possible to use a short signaling packet such as RTS and CTS. RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Physical Layer Convergence Protocol (PLCP) Packet Data Unit (PPDU) Frame Format

A PPDU frame format may include a Short Training Field (STF), a Long Training Field (LTF), a Signal (SIG) field, and a Data field. The most basic PPDU frame format (e.g., a non-High Throughput (non-HT) frame format) may include only a Legacy-STF (L-STF), a Legacy-LTF (L-LTF), a SIG field, and a DATA field. An additional (or a different type of) STF, LTF, and SIG field may be included between the SIG field and the DATA field according to the type of a PPDU frame format (e.g., HT-mixed format PPDU, HT-greenfield format PPDU, Very High Throughput (VHT) PPDU, or the like).

The STF is a signal used for signal detection, Automatic Gain Control (AGC), diversity selection, precise time synchronization, and the like, and the LTF is a signal used for channel estimation, frequency error estimation, and the like. Both the STF and the LTF may be collectively referred to as a PCLP preamble, and it may be said that the PLCP preamble is a signal used for synchronization and channel estimation of an OFDM PHY layer.

The SIG field may include a RATE field and a LENGTH field. The RATE field may include information about the modulation scheme and coding rate of data. The LENGTH field may include information about the length of the data. The SIG field may further include parity bits, SIG TAIL bits, and the like.

The DATA field may include a SERVICE field, a PLCP Service Data Unit (PSDU), and PPDU TAIL bits, and when needed, padding bits. A part of the bits of the SERVICE field may be used for synchronization of a descrambler at a receiving end. The PSDU may correspond to a MAC PDU defined at the MAC layer and include data generated/used by a higher layer. The PPDU TAIL bits may be used to return an encoder to a zero state. The padding bits may be used to match the length of the DATA field on a predetermined unit basis.

A MAC PDU is defined according to various MAC frame formats. A basic MAC frame includes a MAC header, a frame body, and a Frame Check Sequence (FCS). A MAC frame may include a MAC PDU and transmitted/received in a PSDU of the data part of the PPDU frame format.

Meanwhile, a Null Data Packet (NDP) frame format is a frame format that does not include a data packet. That is, an NDP frame is a frame that includes only the PLCP header part (i.e., the STF, LTF, and SIG field) of the general PPDU format, without the other part (i.e., the DATA field) of the general PPDU format. The NDP frame format may be referred to as a short frame format.

Single User (SU) Frame/Multiple User (MU) Frame Structure

The present invention proposes a method for configuring a SIG field in an SU frame and an MU frame in a WLAN system operating at sub-1 GHz (e.g., 902 to 928 MHz). The SU frame may be used in SU-MIMO, and the MU frame may be used in MU-MIMO. Herein, the following description is given with the appreciation that a frame may be a data frame or an NDP frame.

Figure 9:
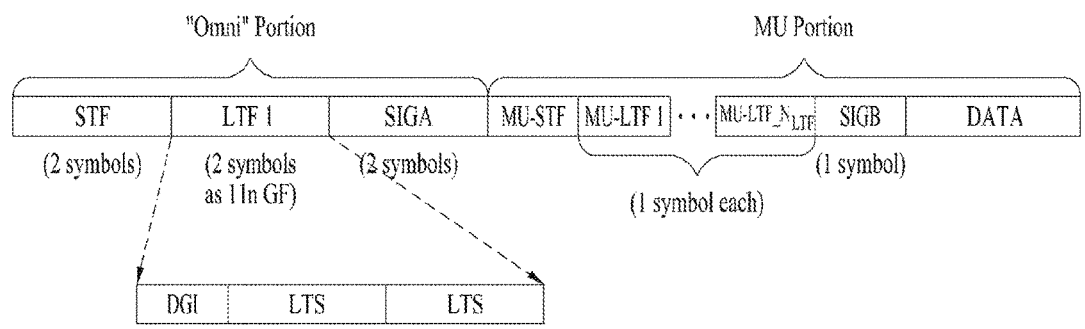
FIG. 9 is a diagram illustrating an exemplary Single User (SU)/Multi-User (MU) frame format.

FIG. 9 is a diagram illustrating an exemplary SU/MU frame format.

In the example of FIG. 9, an STF, LTF 1, a Signal A (SIG-A) field correspond to an omni portion in the sense that they are transmitted to all STAs omni-directionally, and the omni portion may be transmitted without beamforming or precoding. As illustrated in the example of FIG. 9, the SU/MU frame format is a non-NDP frame format.

Meanwhile, an MU-STF, MU-LTF1, . . . , MU-LTF_$N_{LTF}$, and a Signal B (SIG-B) field that follow the SIG-A field are transmitted user-specifically, and may be transmitted through beamforming or precoding. An MU portion may include an MU-STF, MU-STF(s), a SIG-B field, and a DATA field in the exemplary frame format of FIG. 9.

In the omni portion, the STF, LTF1, and SIG-A field may be transmitted in a single stream for each subcarrier. This may be expressed as follows.

$$[x_k]_{N_{TX} \times 1} = [Q_k]_{N_{TX} \times 1} d_k \quad \text{[Equation 1]}$$

In [Equation 1], k represents a subcarrier (or tone) index, $x_k$ represents a signal transmitted on subcarrier k, and $N_{TX}$ represents the number of Tx antennas. $Q_k$ represents a column vector by which the signal transmitted on subcarrier k is encoded (e.g., spatially mapped), and $d_k$ represents data input to an encoder. In [Equation 1], time-domain Cyclic Shift Delay (CSD) may be applied to $Q_k$. Time-domain CSD is equivalent to frequency-domain phase rotation or phase shift. Therefore, $Q_k$ may include a phase shift value for tone k, caused by time-domain CSD.

If the frame format illustrated in the example of FIG. 9 is used, all STAs may receive the STF, LTF1, and SIG-A field, and each STA may decode the SIG-A field by channel estimation based on the STF and LTF1.

The SIG-A field may include information about a length/duration, a channel bandwidth, the number of spatial streams, and so on. The SIG-A field is two OFDM symbols long. Because one OFDM symbol uses Binary Phase Shift Keying (BPSK) for 48 data tones, the OFDM symbol may represent 24-bit information. Therefore, the SIG-A field may include 48-bit information.

[Table 3] below illustrates exemplary bit allocations of the SIG-A field for an SU case and an MU case.

TABLE 3

|  | SU | MU |
| --- | --- | --- |
| SU/MU Indication | 1 | 1 |
| Length/Duration | 9 | 9 |
| MCS | 4 |  |
| BW | 2 | 2 |
| Aggregation | 1 |  |
| STBC | 1 | 1 |
| Coding | 2 | 5 |
| SGI | 1 | 1 |
| GID |  | 6 |
| Nsts | 2 | 8 |
| Uplink/Downlink | 1 |  |
| PAID | Uplink: 9 | |
|  | Downlink: 6 | |

TABLE 3-continued

|  | SU | MU |
| --- | --- | --- |
| COLOR | Uplink: 0 | |
|  | Downlink: 3 | |
| ACK Indication | 2 | 2 |
| Reserved | 2 | 3 |
| CRC | 4 | 4 |
| Tail | 6 | 6 |
| Total | 48 | 48 |

In [Table 3], the SU/MU Indication field is used to distinguish an SU frame format from an MU frame format.

The Length/Duration field indicates the number of OFDM symbols (i.e., duration) or bytes (i.e., length) of the frame. If the Aggregation field of an SU frame is set to 1, the Length/Duration field is interpreted as a Duration field, whereas if the Aggregation field of the SU frame is set to 0, the Length/Duration field is interpreted as a Length field. The Aggregation field is not defined for an MU frame and the MU frame is configured so that aggregation may always be applied. Accordingly, the Length/Duration field is interpreted as a Duration field for the MU frame.

The Modulation and Coding Scheme (MCS) field indicates an MCS used for PSDU transmission. The MCS field is transmitted in the SIG-A field, only for an SU frame. If other STAs (i.e., third party STAs with no direct relation to transmission and reception between two STAs) receive the SU frame, they may calculate the duration of the current received SU frame (i.e., an SU-beamformed frame with an Aggregation field set to 0) based on the values of the Length/Duration and MCS fields. On the other hand, for the MU frame, the MCS field is not included in the SIG-A field but in the SIG-B field carrying user-specific information. Thus, an MCS is applicable to each user independently.

The BandWidth (BW) field indicates the channel bandwidth of the transmitted SU or MU frame. For example, the BW field may be set to a value indicating one of 2 MHz, 4 MHz, 8 MHz, 16 MHz, and 8+8 MHz.

The Aggregation field indicates whether PSDUs are combined into an MPDU (i.e., Aggregated MPDU (A-MPDU)). If the Aggregation field is set to 1, this means that PSDUs are combined into an A-MPDU and transmitted. If the Aggregation field is set to 0, this means that PSDUs are not combined into an A-MPDU and transmitted. Because PSDUs are always transmitted in an A-MPDU in an MU frame, there is no need for signaling the Aggregation field and thus the Aggregation field is not included in the SIG-A field in the MU frame.

The Space and Time Block Coding (STBC) field indicates whether STBC is applied to the SU frame or the MU frame.

The Coding field indicates a coding scheme used for the SU frame or the MU frame. For the SU frame, Binary Convolutional Code (BCC), Low Density Parity Check (LDPC), or the like may be used. For the MU frame, an independent coding scheme may be used for each user, and to support the independent coding, the Coding field may be defined to be two or more bits.

The Short Guard Interval (SGI) field indicates whether an SGI is used for PSDU transmission in the SU frame or the MU frame. If an SGI is used in the MU frame, this may imply that the SGI is applied commonly to all users belonging to an MU-MIMO group.

The Group Identifier (GID) field provides MU group information in the MU frame. For the SU frame, there is no need for defining a user group and thus the GID field is not included in the SIG-A field.

The Number of space-time streams (Nsts) field indicates the number of spatial streams in the SU frame or the MU frame. For the MU frame, the Nsts field indicates the number of spatial streams for each of STAs belonging to an MU group, and for this purpose, the Nsts field needs 8 bits. Specifically, since one MU group may include four users at maximum and up to four spatial streams may be transmitted for each user, the Nsts field needs eight bits.

The Uplink/Downlink field explicitly indicates whether the frame is a UL frame or a DL frame. It may be regulated preliminarily that the Uplink/Downlink field is defined only for an SU frame, not for an MU frame and the MU frame is always a DL frame.

The Partial Association Identifier (PAID) field indicates the ID of a receiving STA in the SU frame. In a UL frame, the PAID is a part of a Basic Service Set Identifier (BSSID). In a DL frame, the PAID may be configured by hashing the BSSID of an AP and the AID of a STA. For example, a BSSID is the MAC address of an AP, 48 bits long. An AID is identification information or an address that an AP allocates to a STA associated with the AP, which is 16 bits long.

Further, the PAID field may be defined to be 9 bits long in a UL frame, and 6 bits long in a DL frame. A method for determining a PAID value will be described below in detail.

Also, the COLOR field is not defined for a UL frame, whereas the COLOR field may be defined to be 3 bits long for a DL frame. The COLOR field may have a value ranging from 0 to 7. The COLOR field may be used for the purpose of identifying a BSS which has transmitted a DL frame. The STA may determine whether the frame has been transmitted from a BSS to which the STA belongs by the COLOR field. Meanwhile, in the case of a UL frame, since it is possible to identify a BSS transmitting the frame just with the PAID field, the COLOR field is not included in the SIG-A field.

The ACK indication field listed in [Table 3] indicates the type of an ACK transmitted after the SU frame or the MU frame. For example, if the value of the ACK indication field is 00, it indicates a normal ACK, if the value of the ACK indication field is 01, it indicates a block ACK, and the value of the ACK indication field is 10, it indicates no ACK. However, the ACK indication field is not limited to the three types, and three or more types of ACKs may be defined according to the properties of response frames.

Meanwhile, the SIG-B field of an MU frame may include user-specific information, as illustrated in the example of FIG. 9. [Table 4] below lists exemplary fields of the SIG-B field in the MU frame. Also, the following [Table 1] lists various parameters applied to a PPDU with respect to the respective BWs of 2, 4, 8, and 16 MHz.

TABLE 4

| | BW | | | |
|---|---|---|---|---|
| | 2 MHz | 4 MHz | 8 MHz | 16 MHz |
| MCS | 4 | 4 | 4 | 4 |
| Tail | 6 | 6 | 6 | 6 |
| CRC | 8 | 8 | 8 | 8 |
| Reserved | 8 | 9 | 11 | 11 |
| Total | 26 | 27 | 29 | 29 |

In [Table 4], the MCS field indicates the MCS value of a PPDU transmitted in an MU frame, for each user.

The TAIL bits may be used to return an encoder to a zero state.

The Cyclic Redundancy Check (CRC) field may be used to detect errors by a STA receiving the MU frame.

PAID Determination Method

A PAID is a non-unique ID of a STA. As described before with reference to [Table 3], the PAID may be included in an SU frame. Specifically, the PAID may be included in an SU frame defined for a sub-1 GHz operating frequency to which the present invention is applicable.

[Table 5] below describes a conventional method for determining a PAID value according to each frame type.

TABLE 5

| Condition | PAID |
|---|---|
| Addressed to AP | [Equation 2] $(dec(BSSID[39:47])mod(2^9 - 1)) + 1$ |
| Addressed to Mesh STA | [Equation 3] BSSID [40:47] ∥ 1 |
| Sent by an AP and addressed to a STA associated with that AP or sent by a DLS or TDLS STA in a direct path to a DLS or TDLS STA | [Equation 4] $(dec(AID[0:8]) + dec(BSSID[44:47]XORBSSID[40:43]) \times 2^5)mod\ 2^6$ |
| Otherwise | 0 |

In the equations included in [Table 5], dec(A) represents the decimal value of a binary value A. A[b:c] represents bit b to bit c of the binary value A, when the first bit of the binary value A is bit 0. Mod represents a modulo operation, XOR represents an exclusive OR operation, and ∥ represents a concatenation operation.

In [Table 5], the condition "Addressed to AP" corresponds to a case in which a STA transmits a UL frame to an AP. In this case, a PAID value may be calculated by representing the 40$^{th}$ to 48$^{th}$ nine bits of a 48-bit BSSID (i.e., BSSID[39:47] represents bit 39 to bit 47 of the BSSID) as a decimal value, performing a (2$^9$-1) modulo operation on the decimal value, and adding 1 to the result of the modulo operation. Because 1 is added to the result of the modulo operation, the PAID value is calculated to be a non-zero value in this case.

In the conventional PAID value calculation, PAID=0 is used for the usage of multi casting/broadcasting.

Meanwhile, the condition "Addressed to Mesh STA" in [Table 5] corresponds to a case in which a frame is transmitted to a mesh STA, and a PAID is calculated by concatenating 1 to BSSID[40:47].

In [Table 5], the condition "Sent by an AP and addressed to a STA associated with that AP" corresponds to a case in which an AP transmits a DL frame to a STA associated with the AP. Further, the condition "sent by a DLS or TDLS STA in a direct path to a DLS or TDLS STA" corresponds to a case in which one Direct Link Setup (DLS) or Tunneled DLS (TDLS) STA transmits a frame to another DLS or TDLS STA via a direct path. In this case, a PAID is calculated by hashing a BSSID and an AID. Specifically, eight bits at the 1$^{st}$ to 9$^{th}$ positions of an AID (i.e., AID[0:8]) are represented as a decimal value. Four bits at the 45$^{th}$ to 48$^{th}$ positions of a BSSID (i.e., BSSID[44:47]) and four bits at the 41th to 44$^{th}$ positions of the BSSID (i.e., BSSID[40:43]) are XOR-operated, represented as a decimal value, and then multiplied by 2$^5$. Then, a PAID is calculated by adding the two decimal values and performing a 2$^6$ modulo operation on the sum.

Herein, a PAID value is 0 for a frame that an AP multicasts/broadcasts to all STAs or a frame transmitted by a non-associated STA. This implies that if the value of the PAID field of a frame detected by a STA is 0, the STA receives the frame and performs PSDU decoding.

Only for a frame with a PAID value that is 0 or matches (dec(BSSID[39:47])mod($2^9-1$))+1, an AP decodes a PSDU, determining that the frame is destined (or highly likely to be destined) for the AP.

Only for a frame with a PAID value that is 0 or matches (dec(AID[0:8])+dec(BSSID[44:47]XORBSSID[40:43])×$2^5$) mod $2^6$, a STA decodes a PSDU, determining that the frame is destined (or highly likely to be destined) for the STA.

To support the above operations, when allocating an AID to a STA, the AP should not allocate the STA to an AID which results in 0 as the value of (dec(AID[0:8])+dec(BSSID[44:47]XORBSSID[40:43])×$2^5$)mod $2^6$. If the AP allocates the STA to an AID which results in 0 as the value of (dec(AID[0:8])+dec(BSSID[44:47]XORBSSID[40:43])×$2^5$) mod $2^6$, the PAID of a DL frame transmitted to the STA is 0 according to [Table 5]. As a result, all other STAs capable of detecting this frame receive the frame and perform PSDU decoding, determining that the frame is a multicast/broadcast frame, thereby obstructing an overall system operation.

For a similar reason, when allocating an AID to a STA, the AP should not allocate the STA to an AID which results in 0 as the value of (dec(AID[0:8])+dec(BSSID[44:47]XORBSSID[40:43])×$2^5$)mod $2^6$. If the AP allocates the STA to an AID which results in (dec(BSSID[39:47])mod($2^9-1$))+1 as the value of (dec(AID[0:8])+dec(BSSID[44:47]XORBSSID[40:43])×$2^5$)mod $2^6$, the STA unnecessarily receive a UL frame transmitted to the AP by any other STA and perform PSDU decoding, determining that the frame is destined for the STA.

In the presence of an Overlapping BSS (OBSS), the AP should determine an AID value to be allocated to a STA that belongs to its BSS, in consideration of the BSSID of an OBSS AP (i.e., the BSSID of the OBSS). In other words, when allocating an AID to the STA, the AP should not allocate the STA to an AID that results in (dec(OBSS BSSID[39:47])mod($2^9-1$))+1 as the value of (dec(AID[0:8])+dec(BSSID[44:47]XORBSSID[40:43])×$2^5$)mod $2^6$.

If the AP allocate the STA to an AID that results in (dec(OBSS BSSID[39:47])mod($2^9-1$))+1 as the value of (dec(AID[0:8])+dec(BSSID[44:47]XORBSSID[40:43])×$2^5$) mod $2^6$, the STA may unnecessarily receive an OBSS UL frame that a STA belonging to the OBSS transmits to the AP of the OBSS, and perform PSDU decoding, determining that the OBSS UL frame is destined for the STA.

Therefore, in order to use PAIDs properly for their purpose, when the AP allocates AIDs to STAs, a PAID value for a DL frame, calculated by hashing an AID with a BSSID should be different from a PAID value set for a specific frame type such as a multicast/broadcast frame or a PAID value set for a specific STA, as in a UL frame transmitted to the AP or the OBSS AP. Further, an AID value that may cause this case should not be allocated to an individual STA, and it is preferred that the AID value is used for another usage such as a multicast frame or the like.

According to the above example of the present invention, [Table 5] is modified to [Table 6] as follows.

TABLE 6

| Condition | PAID |
|---|---|
| A frame that is not a Control frame that is Addressed to AP | [Equation 2] (dec(BSSID[39:47])mod($2^9$ − 1)) + 1 |
| Addressed to Mesh STA | [Equation 3] BSSID [40:47] ∥ 1 |

TABLE 6-continued

| A frame that is not a Control frame that is Sent by an AP and addressed to a STA associated with that AP . . . | [Equation 4] (dec(AID[0:8]) + dec(BSSID[44:47]XORBSSID[40:43]) × $2^5$)mod $2^6$ |
|---|---|
| Otherwise | 0 |

In [Table 6], the condition "A frame that is not a Control frame that is addressed to an AP" corresponds to a frame directed to an AP (i.e., a UL frame), which is not a control frame. In this case, a PAID is calculated according to [Equation 2].

In [Table 6], the condition "A frame that is not a Control frame that is Sent by an AP and addressed to a STA associated with that AP . . . ." corresponds to a frame directed to a STA associated with the AP or a DLS/TDLS STA (i.e., a DL frame), which is not a control frame. In this case, a PAID is calculated according to [Equation 4].

In a case other than the above two cases (i.e., a UL control frame or a DL control frame), the PAID of the frame is set to 0.

Improved PAID Determination Method

Although a control frame and a non-control frame are not distinguished from each other in the conventional PAID determination method, the present invention proposes a method for setting a specific value as the PAID value of a control frame in order to solve a problem encountered with the conventional PAID determination method. Additionally, the present invention proposes a method for setting the Uplink/Downlink field or COLOR field of the SIG-A field of a control frame to a specific value.

Control frame types include, for example, RTS frame, CTS frame, ACK frame, Block ACK frame, Power Save-Poll (PS-Poll) frame, and Contention Free-END (CF-END) frame. Such a control frame may include a Duration field in its MAC header, and adjacent STAs may set Network Allocation Vectors (NAVs) for virtual carrier sensing by detecting or overhearing the control frame. The STAs, which have set NAVs, defer channel access (or medium access) during a predetermined time period.

In the case where a PAID value is set for a control frame in the conventional manner, if the control frame is unicast to a specific STA, other adjacent STAs do not receive/decode the control frame because the PAID of the control frame does not match their PAIDs. Then, the other adjacent STAs perform channel access without an operation of setting a NAV by checking the Duration field of the control frame. As a consequence, although the STA transmitting the control frame operates based on deferral of channel access of the other STAs during a time period indicated by the Duration field, the other STAs actually perform channel access. The resulting collision degrades overall system performance or causes malfunction.

To avert the problem, a description will be given below of a method for setting the Uplink/Downlink field, PAID field, or COLOR field of a control frame (e.g., a frame requiring NAV setting of adjacent STAs through its Duration field) to a specific value.

According to an example of the present invention, while a PAID is calculated/set for a frame other than a control frame in the manner illustrated in [Table 5], the PAID value may be set to 0 for a control frame. This means that even when the control frame is unicast, the PAID is also set to 0. Therefore, this case should be distinguished from setting of a PAID to 0 for a multicast/broadcast frame. Meanwhile, other STAs receiving a control frame with PAID=0 may perform virtual carrier sensing properly by receiving the control frame and decoding a PSDU.

Further, since the control frame should be transmitted in such a manner that the control frame may be overheard by all adjacent STAs, not limited to a BSS (or an AP) to which the STA belongs, there is no need for defining (or configuring) a COLOR field, and for this purpose, the control frame may be transmitted as a UL frame type. Accordingly, the Uplink/Downlink field is set to a value indicating UL frame and the COLOR field is not included, in the control frame.

Or the PAID may be set to 0 and the COLOR field may be set to the COLOR value of the BSS to which the STA transmitting the control frame belongs, in the control frame, so that STAs may identify an ongoing frame exchange sequence in a BSS to which they belong. In this case, the Uplink/Downlink field of the control frame is set to a value indicating DL frame.

Or it may be indicated that the control frame is for the purpose of overhearing by setting the PAID of the control frame to 0, and the COLOR field of the control frame to a specific value (e.g., 0) at the STA transmitting the control frame, in order to indicate STAs that the STAs are supposed to decode the corresponding frame exchange sequence irrespective of their BSS. In this case, the Uplink/Downlink field of the control frame is set to a value indicating DL frame.

Figure 10:
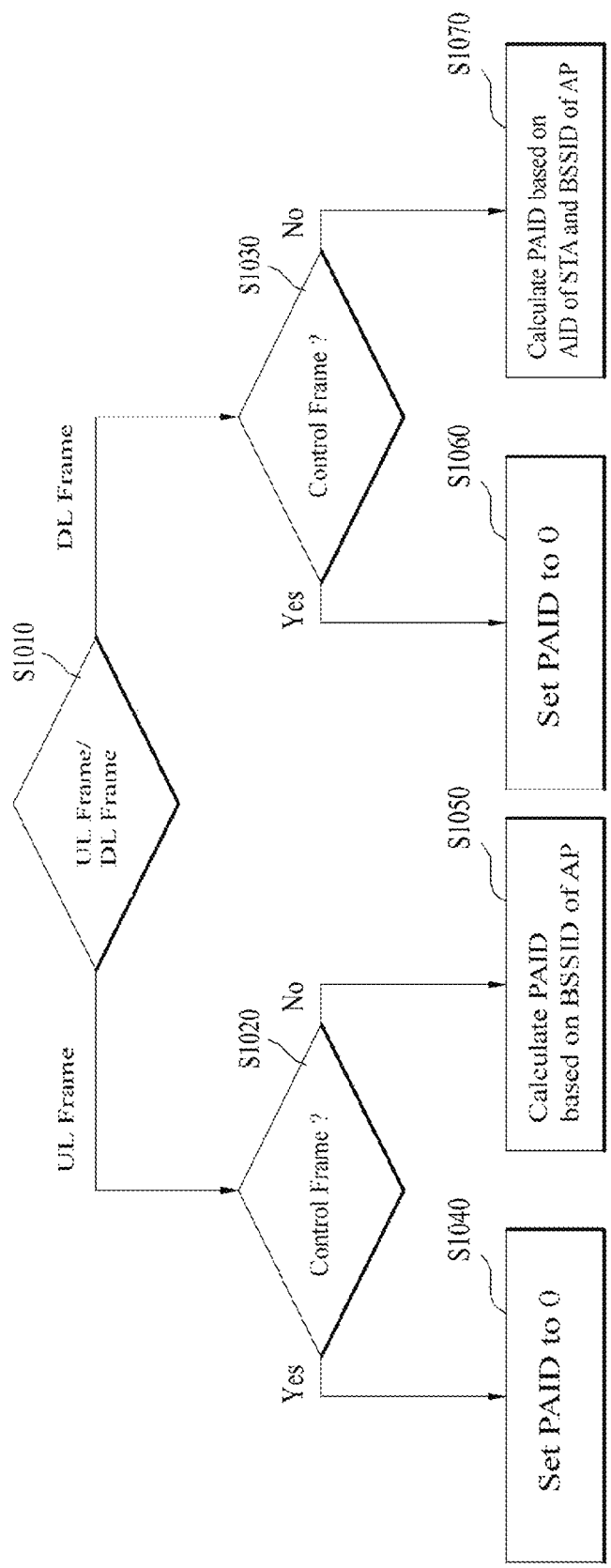
FIG. 10 is a flowchart illustrating an exemplary method for transmitting and receiving a frame according to the present invention.

FIG. 10 is a flowchart illustrating an exemplary method for transmitting and receiving a frame according to the present invention.

In step S1010, a transmission entity (e.g., an AP STA or a non-AP STA) may determine whether a frame to be transmitted is a UL frame (i.e., a frame directed from a non-AP STA to an AP) or a DL frame (i.e., a frame directed from an AP to a STA). In the case of a UL frame, the transmission entity proceeds to step S1020, and in the case of a DL frame, the transmission entity proceeds to step S1030.

In step S1020, the transmission entity determines whether the UL frame to be transmitted is a control frame. If the UL frame to be transmitted is a control frame, the transmission entity sets the PAID of the frame to be transmitted to 0 in step S1040. If the UL frame to be transmitted is not a control frame, the transmission entity calculates the PAID of the frame based on the BSSID of the AP (e.g., according to [Equation 2] in [Table 6]) in step S1050.

In step S1030, the transmission entity determines whether the DL frame to be transmitted is a control frame. If the DL frame to be transmitted is a control frame, the transmission entity sets the PAID of the frame to 0 in step S1060. If the DL frame to be transmitted is not a control frame, the transmission entity calculates the PAID of the frame based on the AID of the STA and the BSSID of the AP (e.g., according to [Equation 4] in [Table 6]) in step S1070.

While not shown in FIG. 10, a reception entity (e.g., an AP STA or a non-AP STA) receiving the frame checks the PAID of the detected frame and decodes a PSDU of the frame, if the PAID is identical to the PAID of the reception entity (e.g., in the case of an AP STA, if a value calculated by [Equation 2] in [Table 6] is equal to the PAID value of the detected frame, and in the case of a non-AP STA, if a value calculated by [Equation 4] in [Table 6] is equal to the PAID value of the detected frame) or the PAID is 0.

While the exemplary method depicted in FIG. 10 is described as a series of operations, for clarity of description, this does not limit the order of steps. When needed, the steps may be performed at the same time or in a different order. Moreover, all steps depicted in FIG. 10 are not needed to implement the method proposed by the present invention.

The method for transmitting and receiving a frame (especially, the PAID configuring method) according to the present invention, depicted in FIG. 10, may be implemented so that the foregoing various embodiments of the present invention may be applied independently or two or more of them may be applied simultaneously.

Figure 11:
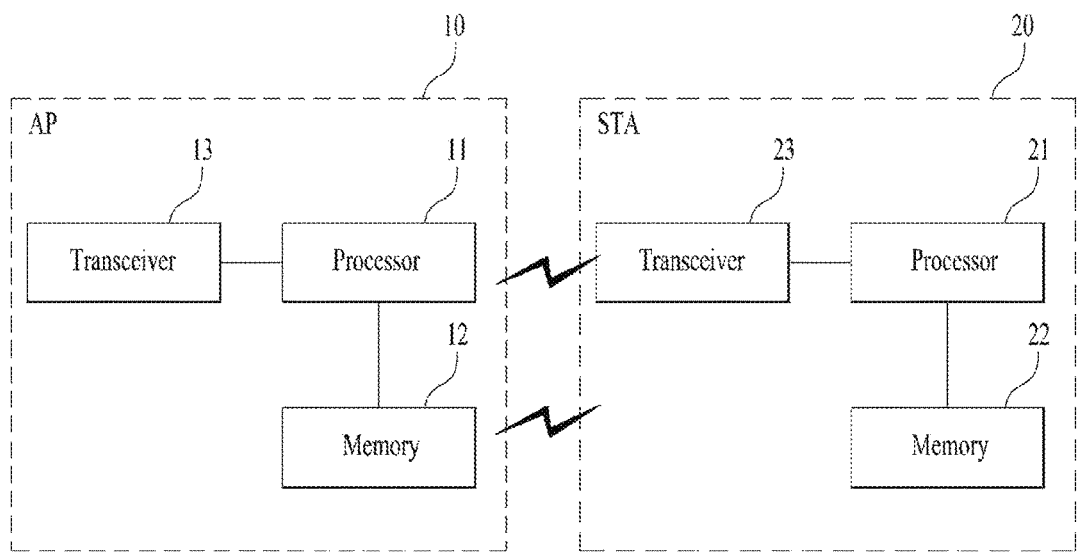
FIG. 11 is a block diagram of wireless apparatuses according to an embodiment of the present invention.

FIG. 11 is a block diagram of wireless apparatuses according to an embodiment of the present invention.

An AP 10 may include a processor 11, a memory 12, and a transceiver 13, and a STA 20 may include a processor 21, a memory 22, and a transceiver 23. The transceivers 13 and 23 may be configured to transmit and receive wireless signals, and implement the PHY layer according to, for example, an IEEE 802 system. The processors 11 and 12 may be connected to the transceivers 13 and 23, and may implement the PHY layer and/or the MAC layer according to the IEEE 802 system. The processors 11 and 21 may be configured to perform operations according to the foregoing various embodiments of the present invention. Also, modules for performing AP operations and STA operations according to the various embodiments of the present invention may be stored in the memories 12 and 22 and executed by the processors 11 and 21. The memories 12 and 22 may reside inside or outside of the processors 11 and 21 and may be connected to the processors 11 and 21 by known means.

If the AP 10 transmits a frame, the processor 11 may be configured to determine whether the frame (i.e., a DL frame) is a control frame. If the DL frame is a control frame, the processor 11 may set the PAID of the DL frame to 0. If the DL frame is not a control frame, the processor 11 may calculate/set the PAID of the DL frame based on the AID of a STA and the BSSID of the AP (e.g., according to [Equation 4] in [Table 6]).

Upon receipt of a frame in the AP 10, if the PAID of the frame (i.e., a UL frame) is 0 or is equal to a value calculated by [Equation 2] in [Table 6], the processor 11 may be configured to decode a PSDU of the UL frame.

If the STA 20 transmits a frame, the processor 21 may be configured to determine whether the frame (i.e., a UL frame) is a control frame. If the UL frame is a control frame, the processor 21 may set the PAID of the UL frame to 0. If the UL frame is not a control frame, the processor 21 may calculate/set the PAID of the UL frame based on the BSSID of the AP (e.g., according to [Equation 2] in [Table 6]).

Upon receipt of a frame in the STA 20, if the PAID of the frame (i.e., a DL frame) is 0 or is equal to a value calculated by [Equation 4] in [Table 6], the processor 21 may be configured to decode a PSDU of the DL frame.

The above-described AP and STA may be configured specifically in such a manner that the descriptions of the foregoing various embodiments may be implemented independently or two or more of the embodiments may be implemented simultaneously, and a redundant description is avoided for clarity.

The embodiments of the present invention may be achieved by various means, for example, hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described above in the context of an IEEE 802.11 system, the same thing is applicable to many other mobile communication systems.

The invention claimed is:

1. A method for transmitting an uplink frame by a Station (STA) in a wireless communication system, the method comprising:
    setting a partial association identifier (PAID) in a signal (SIG) field of the uplink frame based on whether or not the uplink frame contains a control frame;
    transmitting, to an access point (AP), the uplink frame including the SIG field; and
    receiving, from the AP, a downlink frame including a SIG field, the SIG field of the downlink frame including a downlink PAID and a basic service set (BSS) color,
    wherein when the uplink frame does not contain the control frame, the PAID set in the SIG field of the uplink frame corresponds to an uplink PAID of the AP calculated based on a Basic Service Set Identifier (BSSID) of the AP, and a length of the uplink PAID corresponds to a sum of a length of the downlink PAID and a length of the BSS color, and
    wherein when the uplink frame contains the control frame, the PAID set in the SIG field of the uplink frame is fixed to a specific value which is different from the uplink PAID of the AP.

2. The method according to claim 1, wherein the uplink PAID of the AP is calculated by (BSSID[39:47] mod($2^9-1$))+1, where 'BSSID [39:47]' denotes 39th-bit to 47th-bit of the BSSID of the AP, and 'mod' denotes a modulo operation.

3. The method according to claim 1, wherein the uplink frame is a non-Null Data Packet (non-NDP) frame.

4. The method according to claim 1,
    wherein the uplink frame has a single user (SU) format in which the SIG field of the uplink frame further includes an uplink/downlink indication, and
    wherein the BSS COLOR is not present in the SIG field of the uplink frame.

5. The method according to claim 1, wherein the length of the uplink PAID is 9 bits, the length of the downlink PAID is 6 bits and the length of the BSS color is 3 bits.

6. The method according to claim 1, wherein the control frame is one of a plurality of control frames including a request-to-send (RTS) frame, a clear-to-send (CTS) frame, an acknowledgement (ACK) frame, a Block-ACK frame, a power saving-poll (PS-Poll) frame and a contention free-end (CF-END) frame.

7. A Station (STA) for transmitting an uplink frame in a wireless communication system, the STA comprising:
    a transceiver; and
    a processor,
    wherein the processor is configured to set a partial association identifier (PAID) in a signal (SIG) field of the uplink frame based on whether or not the uplink frame contains a control frame to transmit, to an access point (AP), the uplink frame including the SIG field by controlling the transceiver and to receive, from the AP by controlling the transceiver, a downlink frame including a SIG field, the SIG field of the downlink frame including a downlink PAID and a basic service set (BSS) color,
    wherein when the uplink frame does not contain the control frame, the PAID set in the SIG field of the uplink frame corresponds to an uplink PAID of the AP, and a length of the uplink PAID corresponds to a sum of a length of the downlink PAID and a length of the BSS color, and
    wherein when the uplink frame contains the control frame, the PAID set in the SIG field of the uplink frame is fixed to a specific value which is different from the uplink PAID of the AP.

8. A method for receiving a downlink frame by a Station (STA) in a wireless communication system, the method comprising:
    receiving, from an access point (AP), the downlink frame including a signal (SIG) field;
    checking a basic service set (BSS) color and a Partial Association Identifier (PAID) of the SIG field in the downlink frame; and
    transmitting, to the AP, an uplink frame including a SIG field, the SIG field of the uplink frame including an uplink PAID,
    wherein the PAID of the SIG field in the downlink frame is set based on whether or not the downlink frame contains a control frame,
    wherein when the downlink frame does not contain the control frame, the PAID corresponds to a downlink PAID calculated based on an Association Identifier (AID) allocated to the STA by the AP and a Basic Service Set Identifier (BSSID) of the AP, and a sum of a length of the downlink PAID and a length of the BSS color corresponds to a length of the uplink PAID, and
    wherein when the downlink frame contains the control frame, the PAID is fixed to a specific value which is different from the downlink PAID.

9. The method according to claim 8, wherein the downlink PAID is calculated by (AID[0:8]+(BSSID[44:47] XOR BSSID[40:43])×$2^5$) mod $2^6$,
    where 'AID[0:8]' denotes 0th-bit to 8th-bit of the AID allocated to the STA, 'BSSID[44:47]' denotes 44th-bit to 47th-bit of the BSSID of the AP, and 'mod' denotes a modulo operation.

10. The method according to claim 8, wherein the downlink PAID field is a non-zero value.

11. The method according to claim 8, wherein the downlink frame has a single user (SU) format, and the BSS COLOR is set to a value ranging from 0 to 7.

12. The method according to claim 8, wherein the downlink frame is a non-Null Data Packet (non-NDP) frame.

13. The method according to claim 8,
wherein the SIG field of the downlink frame further includes an uplink/downlink indication, and
wherein the BSS COLOR is not present in the SIG field of the uplink frame.

14. The method according to claim 8, wherein the length of the downlink PAID is 6 bits, the length of the uplink PAID is 9 bits and the length of the BSS COLOR is 3 bits.

15. A Station (STA) for receiving a downlink frame in a wireless communication system, the STA comprising:
a transceiver; and
a processor,
wherein the processor is configured to receive, from an access point (AP), the downlink frame including a signal (SIG) field by controlling the transceiver, to check a basic service set (BSS) color and a Partial Association Identifier (PAID) of the SIG field in the downlink frame and to transmit, to the AP, an uplink frame including a SIG field, the SIG field of the uplink frame including an uplink PAID,
wherein the PAID of the SIG field in the downlink frame is set based on whether or not the downlink frame contains a control frame,
wherein when the downlink frame does not contain the control frame, the PAID corresponds to a downlink PAID calculated based on an Association Identifier (AID) allocated to the STA by the AP and a Basic Service Set Identifier (BSSID) of the AP, and a sum of a length of the downlink PAID and a length of the BSS color corresponds to a length of the uplink PAID, and
wherein when the downlink frame contains the control frame, the PAID is fixed to a specific value which is different from the downlink PAID.

\* \* \* \* \*